United States Patent
Lengning et al.

(10) Patent No.: US 7,333,007 B2
(45) Date of Patent: Feb. 19, 2008

(54) PROCESS FOR THE OUTPUT OF INFORMATION IN A VEHICLE

(75) Inventors: Marc Lengning, Munich (DE); Bernhard Schambeck, Menlo Park, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 154 days.

(21) Appl. No.: 11/076,227

(22) Filed: Mar. 10, 2005

(65) Prior Publication Data
US 2005/0206508 A1    Sep. 22, 2005

Related U.S. Application Data

(60) Provisional application No. 60/551,799, filed on Mar. 11, 2004.

(51) Int. Cl.
*B60Q 1/00* (2006.01)
(52) U.S. Cl. .................. 340/439; 340/575; 340/576; 702/182; 702/183; 702/188
(58) Field of Classification Search ............ 340/439, 340/575, 576; 702/182, 183, 188
See application file for complete search history.

(56) References Cited

U.S. PATENT DOCUMENTS

| | | | | |
|---|---|---|---|---|
| 5,150,609 A | * | 9/1992 | Ebner et al. ............... | 73/117.3 |
| 5,465,079 A | * | 11/1995 | Bouchard et al. .......... | 340/576 |
| 5,574,641 A | * | 11/1996 | Kawakami et al. .......... | 701/1 |
| 2005/0143884 A1 | * | 6/2005 | Bihler et al. ................ | 701/36 |

FOREIGN PATENT DOCUMENTS

DE    101 53 987 A1    5/2003

* cited by examiner

*Primary Examiner*—Tai Nguyen
(74) *Attorney, Agent, or Firm*—Crowell & Moring LLP

(57) ABSTRACT

In the case of a process for the output of information in a vehicle having an information source for the output of information which is generated as a function of the driver's behavior and, in the case of which the driver's behavior is determined by using data of one or more driving systems and/or of one or more comfort systems of the vehicle, the nature of the information depends on the driver's driving behavior. The driving behavior is applied to standards and measured on the basis of the respective circumstances.

10 Claims, 2 Drawing Sheets

PROCESS FOR THE OUTPUT OF INFORMATION IN A VEHICLE

CROSS REFERENCE

The present application claims the benefit of priority under 35 U.S.C. § 119 to U.S. Provisional Patent Application No. 60/551,799, filed Mar. 11, 2004. The application is related to U.S. Applications entitled PROCESS FOR THE OUTPUT OF INFORMATION IN A VEHICLE and PROCESS AND APPARATUS FOR THE OUTPUT OF MUSIC INFORMATION IN A VEHICLE filed on even date herewith.

BACKGROUND AND SUMMARY OF THE INVENTION

The invention relates to a process for the output of information in a vehicle, having an information source for the output of information which is generated as a function of the driver's behavior and, in the case of which the driver's behavior is determined via data of one or more driving systems and/or of one or more comfort systems of the vehicle. The term "information" applies mainly to acoustic and/or visual information. However, it may also apply to other types of information, such as tactile information.

A process of the above-mentioned type is known from German Patent Document DE 101 53 987 A1, the specification of which is incorporated by reference herein as non-essential matter. In this case, information, which is generated as a function of the driver's behavior (the driver's behavior being determined via data from one or more driving systems and/or from one or more comfort systems of the vehicle) is emitted at a frequency which is influenced by the driver's condition and/or by the driver's behavior. Thus, a type of feedback concerning the driver's condition and/or the driver's behavior is provided to the information source with the goal of changing their sensitivity. The information system carries out the analysis of driver-condition-relevant or driver-behavior-relevant data already present in the vehicle, and controls the frequency of the information output as a function of these data.

With respect to the above, one aspect of the invention is to improve the useful value of the information output for the driver.

The invention provides a process for the output of information in a vehicle having an information source for the output of information which is generated as a function of the driver's behavior and, in the case of which the driver's behavior is determined via data of one or more driving systems and/or of one or more comfort systems of the vehicle. The nature of the information depends on the driver's driving behavior, and the driving behavior is measured by way of standards applied to the respective physical circumstances.

One aspect of the invention is to adapt the information relative to its nature to the driver's behavior. Standards are used for this purpose on the basis of which the driver's behavior is judged. These standards depend on the respective physical circumstances. As in the case of German Patent document DE 101 53 987 A1, the data relevant to the driver's condition or to the driver's behavior, which are already present in the vehicle, are analyzed for this purpose.

The following example will explain the basic idea of the invention.

It is assumed that the driver is driving around a curve on an icy road at a speed at which he runs the risk of swerving but, in fact, he does not do so. Relative to the physically possible maximum cornering speed, the actual cornering speed amounts to 90% thereof.

This is signaled to the driver by providing information having, for example, the following content: "The cornering speed is only 10% below the momentarily possible maximum speed."

This information is undoubtedly useful to the driver and contributes to increasing traffic safety. The driver experiences feedback related to his driving behavior and can adapt his behavior to the physical conditions, which he frequently cannot recognize with sufficient precision.

On the other hand, it is information which the driver does not receive in the case of conventional warning systems and other information systems. Conventional safety systems, such as a wheel slip system, are activated only when certain physical limits have been reached or exceeded. In the present case, such systems and the pertaining visual and/or acoustic information systems remain inactive.

In addition, the value of the currently effective information can be recognized. It thereby becomes possible to supply to the driver precise information concerning the distance from a critical limit value; in this case, for the cornering speed.

Simultaneously, the information system can be designed such that it becomes active only when the driver is moving in the limit range; thus, in this case, when his cornering speed is in the range of between 80 and 100% of the maximal speed possible in the case of the respective road conditions.

Advantageous developments and further developments of the invention are described and claimed herein.

Other objects, advantages and novel features of the present invention will become apparent from the following detailed description of the invention when considered in conjunction with the accompanying drawings.

DETAILED DESCRIPTION OF THE DRAWINGS

The advantageous developments can essentially be divided into two groups.

The first group relates to the vehicle dynamics.

As already indicated as an example, the information can apply to the lateral and/or longitudinal acceleration of the vehicle versus the respective maximally possible value.

The information can also apply to a time period within which the limit value is reached. For example, the time can be announced and/or indicated within which, in the event of a start from a traffic light, the maximum speed is reached which is permissible within the locality. This information is valuable, for example, when the vehicle is to be moved over fairly long distances at a recommended speed, which coincides with the traffic light phases ("green-light wave"). If the recommended and maximum speeds coincide, the driver thereby receives the information that he is moving at the "right" speed and simultaneously receives the information as to where he is within the traffic light sequence.

Correspondingly, the information can apply to the time for a longitudinal acceleration from a starting value to the stoppage of the vehicle. When the road is slippery or wet, the driver, for example, receives information that he runs the risk of entering the physical limit range.

Finally, the information can be aimed at the constant speed reached relative to the maximal speed. The driver thereby obtains information concerning possible speed or power reserves of the vehicle and can assess the dangerousness of an imminent passing maneuver.

In the case of the second group, the information is aimed at the drive assembly.

Thus, the information can apply to the proportion of the respectively delivered engine power versus the maximal engine power. As in the last example, the driver can thereby assess the power reserves of the vehicle.

Figure 1:
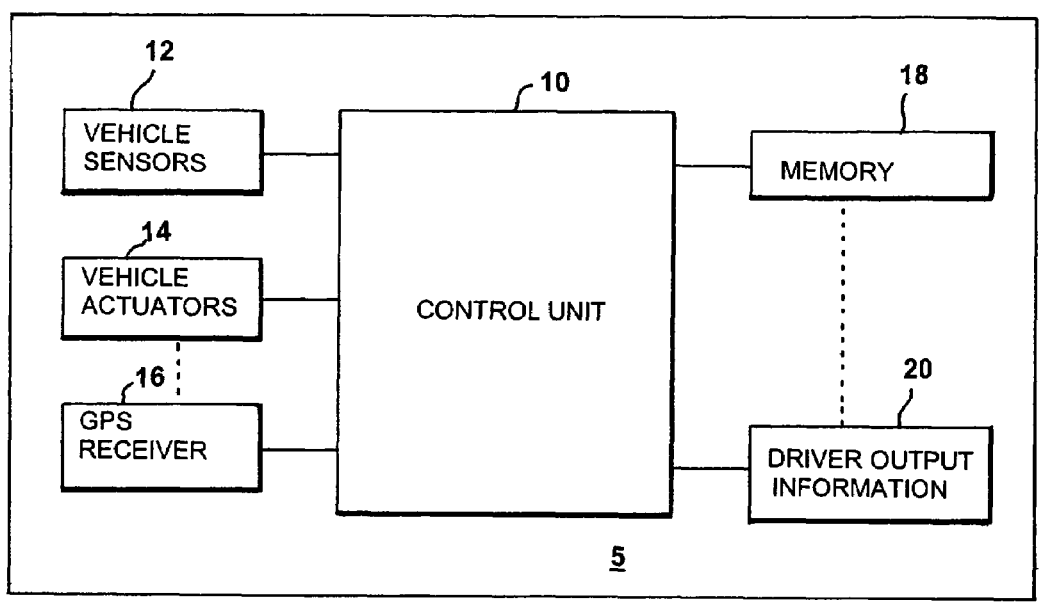
FIG. 1 is a schematic block diagram illustrating an exemplary apparatus for outputting information in a vehicle in accordance with the present invention.

The technical implementation of the invention takes place as follows, with reference being made to FIG. 1, for example.

An assigned control unit 10 analyzes the respective driving situation and the driver's behavior using the information of the vehicle sensors 12 and actuators 14, which information is situated on the database inside the vehicle 5. When one of the provided driving situations is detected in the limit range for dynamics or drive assembly power, the acoustic information and/or graphics provided for this purpose are read out of an onboard voice memory 18 and are announced by way of the loudspeakers of the audio system and/or by way of a monitor 20.

The data, including possible GPS information 16, stored on the database, can be used as input data of the system. The system can be configurable; the contents (audio files and graphics files) are stored, as mentioned above, in the vehicle by way of a memory medium (memory card, hard disc, or the like). However, it is also contemplated to download the contents via the Internet or purchase them at a vehicle dealer.

Figure 2:
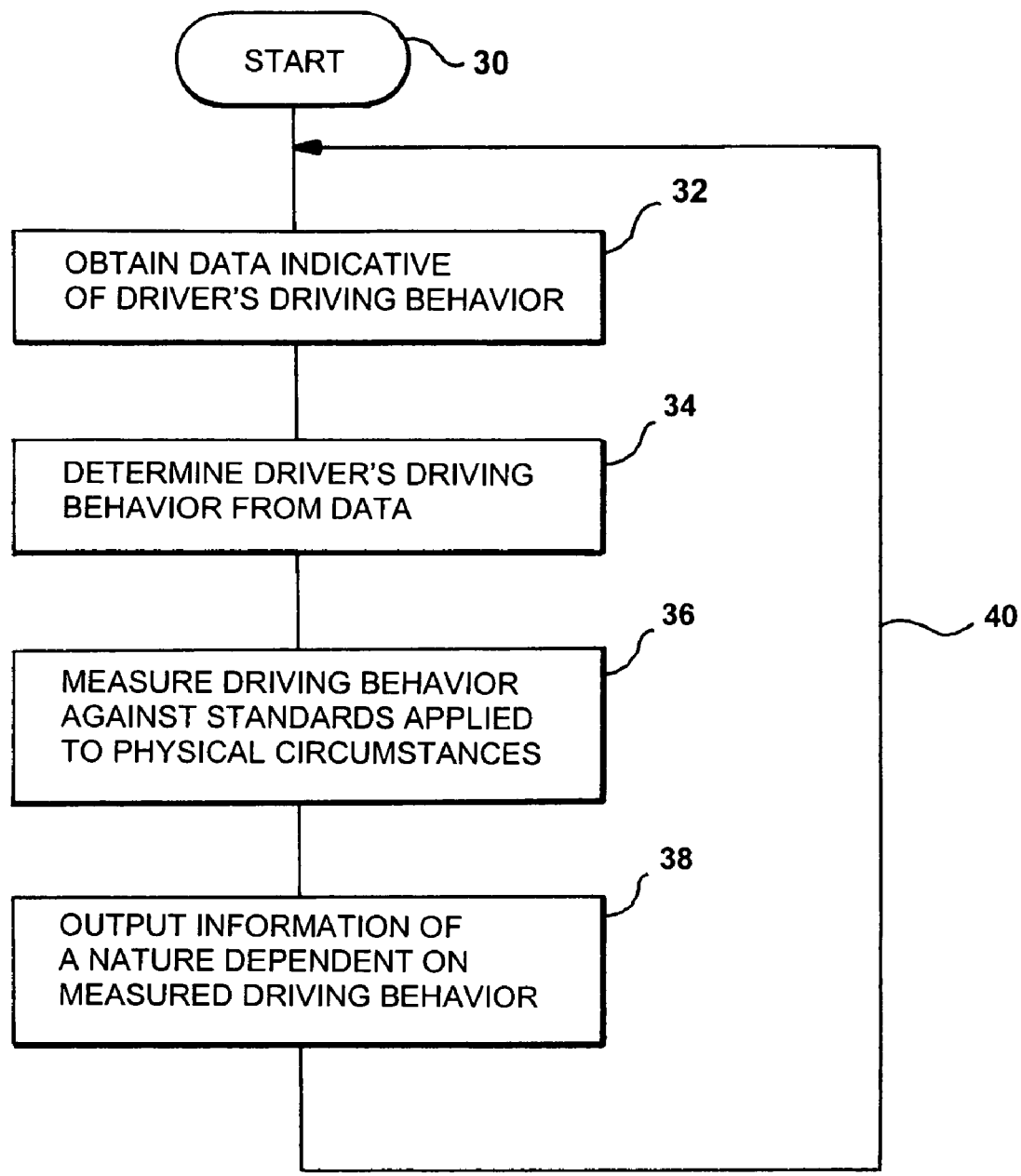
FIG. 2 is a flowchart of an exemplary process for outputting information in a vehicle in accordance with the present invention.

An exemplary process according to the present invention is illustrated in FIG. 2. The process begins at step 30 and proceeds by obtaining data indicative of a driver's driving behavior at step 32. From that data, the process determines the driver's driving behavior at step 34. At step 36, the process measures the driving behavior against standards applied to respective physical circumstances. The process then outputs information, when applicable, of a nature dependent on the measured driving behavior at step 38. The process may continually repeat itself as illustrated by loop line 40.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A process for outputting information via an information source in a vehicle, the information being generated as a function of a driver's driving behavior, the process comprising the acts of:
    obtaining data from at least one of one or more driving systems and one or more comfort systems of the vehicle;
    determining a driver's driving behavior based on said data;
    measuring the driving behavior of the driver relative to vehicle operating limits applied to respective physical circumstances related to the vehicle; and
    outputting information of a nature depending on the measured driving behavior.

2. The process according to claim 1, wherein the information is targeted at vehicle dynamics of the vehicle.

3. The process according to claim 2, wherein the information applies to at least one of a lateral and longitudinal acceleration of the vehicle versus a respective maximum possible value.

4. The process according to claim 2, wherein the information is applied to a time period for a longitudinal acceleration of the vehicle from 0 to a threshold value.

5. The process according to claim 3, wherein the information is applied to a time period for a longitudinal acceleration of the vehicle from 0 to a threshold value.

6. The process according to claim 2, wherein the information applies to a time period for a longitudinal acceleration from a starting value to a stopping of the vehicle.

7. The process according to claim 3, wherein the information applies to a time period for a longitudinal acceleration from a starting value to a stopping of the vehicle.

8. The processing according to claim 1, wherein the information is aimed at a constant speed reached by the vehicle relative to a maximum speed.

9. The process according to claim 1, wherein the information is aimed at a drive assembly of the vehicle.

10. The process according to claim 9, wherein the information applies to a proportion of a respectively delivered engine power versus a maximum engine power.

* * * * *